(12) United States Patent
Yun et al.

(10) Patent No.: US 10,959,244 B2
(45) Date of Patent: Mar. 23, 2021

(54) METHOD AND DEVICE FOR COMMUNICATION IN NARROW BAND SYSTEM

(71) Applicant: Samsung Electronics Co., Ltd., Suwon-si (KR)

(72) Inventors: Yeo-Hun Yun, Hwaseong-si (KR); Peng Xue, Suwon-si (KR); Seung-Joo Maeng, Seongnam-si (KR); Neung-Hyung Lee, Seongnam-si (KR); Chan-Hong Kim, Suwon-si (KR); Min Sagong, Suwon-si (KR); Ji-Yun Seol, Seongnam-si (KR); Yong-Ho Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 99 days.

(21) Appl. No.: 15/744,526

(22) PCT Filed: Jul. 22, 2016

(86) PCT No.: PCT/KR2016/008068
§ 371 (c)(1),
(2) Date: Jan. 12, 2018

(87) PCT Pub. No.: WO2017/014606
PCT Pub. Date: Jan. 26, 2017

(65) Prior Publication Data
US 2018/0206253 A1    Jul. 19, 2018

Related U.S. Application Data

(60) Provisional application No. 62/276,468, filed on Jan. 8, 2016, provisional application No. 62/199,538, filed (Continued)

(51) Int. Cl.
H04W 72/12    (2009.01)
H04L 5/00    (2006.01)
H04W 72/04    (2009.01)

(52) U.S. Cl.
CPC ....... H04W 72/1215 (2013.01); H04L 5/0035 (2013.01); H04L 5/0051 (2013.01);
(Continued)

(58) Field of Classification Search
CPC ... H04L 5/0048; H04L 5/0007; H04L 5/0051; H04L 5/001; H04L 5/0053; H04L 1/0013
See application file for complete search history.

(56) References Cited

U.S. PATENT DOCUMENTS 9,622,230 B2    4/2017  Chen et al.
9,876,618 B2    1/2018  Heo et al.
(Continued)

FOREIGN PATENT DOCUMENTS

CN    103109489 A    5/2013
CN    103220070 A    7/2013
(Continued)

OTHER PUBLICATIONS

Samsung, Considerations of legacy SRS impact on uplink transmission from low-cost UE, 3GPP TSG RAN WG1 Meeting #81, R1-152845, Fukuoka, Japan, May 15, 2015.
(Continued)

*Primary Examiner* — Jung H Park
(74) *Attorney, Agent, or Firm* — Jefferson IP Law, LLP

(57) ABSTRACT

The present disclosure relates to a communication technique for converging a 5G communication system, which is provided to support a higher data transmission rate beyond a 4G system with an IoT technology, and a system therefor. The present disclosure may be applied to an intelligent service (for example, smart home, smart building, smart city, smart
(Continued)

car or connected car, healthcare, digital education, retail business, security and safety-related service, etc.) on the basis of a 5G communication technology and an IoT-related technology. The present disclosure relates to an efficient method and device for uplink communication in a narrow band system which provides an IoT service in a band for a broadband system, and a method for uplink communication in a narrow band system according to an embodiment of the present disclosure comprises the steps of: receiving, by a terminal, control information associated with uplink transmission of symbols from a base station; and performing, by the terminal, the uplink transmission using symbols except a second symbol overlapping with a first symbol for transmission of an uplink reference signal in a broadband system, on the basis of the control information.

20 Claims, 15 Drawing Sheets

Related U.S. Application Data on Jul. 31, 2015, provisional application No. 62/196,415, filed on Jul. 24, 2015, provisional application No. 62/195,607, filed on Jul. 22, 2015, provisional application No. 62/195,562, filed on Jul. 22, 2015.

(52) U.S. Cl.
CPC .......... *H04L 5/0062* (2013.01); *H04L 5/0091* (2013.01); *H04W 72/0413* (2013.01); *H04W 72/0453* (2013.01)

(56) References Cited

U.S. PATENT DOCUMENTS

| | | | |
|---|---|---|---|
| 10,356,725 | B2 | 7/2019 | Lin et al. |
| 2013/0083753 | A1 | 4/2013 | Lee et al. |
| 2013/0114505 | A1* | 5/2013 | Haim ................. H04W 52/146 |
| | | | 370/328 |
| 2013/0322363 | A1 | 12/2013 | Chen et al. |
| 2014/0105130 | A1 | 4/2014 | Noh et al. |
| 2014/0119302 | A1 | 5/2014 | Ann et al. |
| 2014/0140315 | A1 | 5/2014 | Kim et al. |
| 2014/0369324 | A1 | 12/2014 | Lin et al. |
| 2015/0036601 | A1 | 2/2015 | Kim et al. |
| 2015/0131585 | A1 | 5/2015 | Chen et al. |
| 2017/0374675 | A1* | 12/2017 | Hwang ................. H04W 72/04 |
| 2018/0083752 | A1* | 3/2018 | Kim .......................... H04L 1/18 |
| 2018/0131496 | A1 | 5/2018 | Matsumoto et al. |
| 2018/0145802 | A1* | 5/2018 | Hwang ................. H04W 72/04 |

FOREIGN PATENT DOCUMENTS

| | | |
|---|---|---|
| CN | 103401669 A | 11/2013 |
| CN | 104380820 A | 2/2015 |
| KR | 10-2010-0048572 A | 5/2010 |

OTHER PUBLICATIONS

Chinese Office Action dated Mar. 18, 2020, issued in Chinese Patent Application No. 201680043071.7.

* cited by examiner

1611 — : LTE PDCCH

1609 — : LTE PSS

1607 — : LTE SSS

1605 — : LTE PBCH

1603 — : CRS of LTE Xth Antenna Port

1601 — : RE to which Sync Signal of CIoT System is Allocable (a) Normal CP (b) Extended CP

1705 — ▧ : LTE PDCCH

1703 — ▨ : CRS of LTE Xth Antenna Port

1701 — ▦ : Sync Signal of CIoT System

METHOD AND DEVICE FOR COMMUNICATION IN NARROW BAND SYSTEM

CROSS-REFERENCE TO RELATED APPLICATION(S)

This application is a U.S. National Stage application under 35 U.S.C. § 371 of an International application filed on Jul. 22, 2016 and assigned application number PCT/KR2016/008068, which claimed the benefit of U.S. Provisional Applications filed on Jul. 22, 2015 and assigned Ser. No. 62/195,562, filed on Jul. 22, 2015 and assigned Ser. No. 62/195,607, filed on Jul. 24, 2015 and assigned Ser. No. 62/196,415, filed on Jul. 31, 2015 and assigned Ser. No. 62/199,538, and filed on Jan. 8, 2016 and assigned Ser. No. 62/276,468, the entire disclosure of which is hereby incorporated by reference.

TECHNICAL FIELD

The present disclosure relates to a communication method and apparatus in an uplink of a narrow-band system.

BACKGROUND ART

To satisfy demands for wireless data traffic having increased since commercialization of $4^{th}$-generation (4G) communication systems, efforts have been made to develop improved $5^{th}$-generation (5G) communication systems or pre-5G communication systems. For this reason, the 5G communication system or the pre-5G communication system is also called a beyond-4G-network communication system or a post-Long-Term Evolution (LTE) system.

To achieve a high data rate, implementation of the 5G communication system in an ultra-high frequency (mm-Wave) band (e.g., a 60 GHz band) is under consideration. In the 5G communication system, beamforming, massive multi-input multi-output (MIMO), full dimensional MIMO (FD-MIMO), an array antenna, analog beamforming, and large-scale antenna technologies have been discussed to alleviate a propagation path loss and to increase a propagation distance in the ultra-high frequency band.

For system network improvement, in the 5G communication system, techniques such as an evolved small cell, an advanced small cell, a cloud radio access network (RAN), an ultra-dense network, a device to device (D2D) communication, a wireless backhaul, a moving network, cooperative communication, coordinated multi-points (CoMPs), and interference cancellation have been developed.

In the 5G system, advanced coding modulation (ACM) schemes including hybrid frequency-shift keying (FSK) and quadrature amplitude modulation (QAM) modulation (FQAM) and sliding window superposition coding (SWSC), and advanced access schemes including filter bank multi carrier (FBMC), non-orthogonal multiple access (NOMA), and sparse code multiple access (SCMA) have been developed.

Internet, which is a human-oriented connectivity network where humans generate and consume information, is now evolving to the Internet of Things (IoT) where distributed entities, such as things, exchange and process information. The Internet of Everything (IoE) has also emerged, which is a combination of the IoT technology and the Big Data processing technology through connection with a cloud server.

As technology elements, such as sensing technology, wired/wireless communication and network infrastructure, service interface technology, and security technology, have been demanded for IoT implementation, a sensor network, a Machine to Machine (M2M), Machine Type Communication (MTC), and so forth have been recently researched for connection between things.

Such an IoT environment may provide intelligent Internet technology (IT) services that create a new value to human life by collecting and analyzing data generated among connected things. IoT may be applied to a variety of fields including smart home, smart building, smart city, smart car or connected cars, smart grid, health care, smart appliances, advanced medical services, and so forth through convergence and combination between existing IT and various industries.

With a rising demand for data in a wireless communication system, the wireless communication system has moved from a code division multiple access (CDMA) scheme representing 3G mobile communication to an orthogonal frequency multiple access (OFDMA) scheme to transmit more data faster in 4G communication. The OFDMA scheme transmits data by using a plurality of orthogonal frequency components, thereby transmitting more data faster than in the 3G wireless communication scheme, the CDMA scheme. The OFDMA scheme has been employed in various wireless communication systems such as Wireless Broadband (Wibro), etc., as well as Long Term Evolution (LTE) and LTE-Advanced (LTE-A) mobile communication systems.

However, as requirements for various service scenarios have been recently defined, an interest in techniques satisfying requirements in a specific scenario is increasing. Machine type communication (MCT) may be an example. In this regard, the 3rd Generation Partnership Project (3GPP) GSM EDGE Radio Access Network (GERAN) Cellular IoT (CIoT) has standardized a narrow-band communication system operating in a 200-kHz band, and the CIoT technology has been designed mainly considering an empty (clean-slate or stand-alone) band for narrow-band communication. Thus, there are discussions for reforming a low-utilization GSM band for narrow-band techniques by using the CIoT technology. However, since the CIoT technology is designed originally for the empty band as mentioned above, several limitations may exist in operations, when considering inter-working between CIoT and LTE in a band of a legacy LTE system.

Meanwhile, the 3GPP has standardized a system using only six resource blocks (RBs) in the name of Enhanced MTC (eMTC, hereinafter, referred to as 'MTC'). The MTC technology is an IoT technology suggested by the 3GPP. The MTC technology has been designed based on an operation of MTC with legacy LTE in a band of an LTE system. However, a minimum resource unit allocable to an MTC terminal is 1 RB, and thus there is a limitation regarding whether requirements may be satisfied in situations where a plurality of MTC terminals exist.

DETAILED DESCRIPTION OF THE INVENTION

Technical Problem

The present disclosure provides an efficient communication method and apparatus in an uplink (UL) of a narrow-band system.

The present disclosure also provides an efficient communication method and apparatus in a narrow-band system for IoT.

The present disclosure also provides an efficient communication method and apparatus in an UL of a narrow-band system that provides an IoT service in a band of a broadband system.

The present disclosure also provides a method and apparatus for efficiently performing UL transmission and reception in a narrow-band LTE system for CIoT.

Technical Solution

An UL communication method in a narrow-band system according to the present disclosure includes receiving, by a UE, control information related to UL transmission of symbols from a BS, and performing the UL transmission in a narrow-band system using symbols except for a second symbol overlapping with a first symbol for transmission of an UL reference signal in a broadband system, based on the control information.

A UE according to the present disclosure includes a transceiver configured to transmit and receive data and a controller configured to receive control information related to UL transmission of symbols from a BS and to perform the UL transmission in a narrow-band system using symbols except for a second symbol overlapping with a first symbol for transmission of an UL reference signal in a broadband system, based on the control information.

An UL communication method in a narrow-band system according to the present disclosure includes transmitting, by a BS, control information related to UL transmission of symbols to a UE, and receiving UL data from the UE based on the control information, in which in the narrow-band system, the UL data is received through symbols except for a second symbol overlapping with a first symbol for transmission of an UL reference signal in a broadband system.

A BS according to the present disclosure includes a transceiver configured to transmit and receive data and a controller configured to transmit control information related to UL transmission of symbols to a UE and to receive UL data from the UE based on the control information, in which in a narrow-band system, the UL data is received through symbols except for a second symbol overlapping with a first symbol for transmission of an UL reference signal in a broadband system.

A communication method in a narrow-band LTE system according to the present disclosure includes determining a basic frame format for transmission and reception separately for an in-band/guard-band mode or a stand-alone mode, using shortened physical uplink shared channel (PUSCH)/physical uplink control channel (PUSCH) in the in-band mode, using time and frequency resources for each coverage class of a physical random access channel (PRACH), and transmitting a PUCCH using a reserved resource, an additionally allocated resource, or a PUSCH.

MODE FOR CARRYING OUT THE INVENTION

Figure 1:
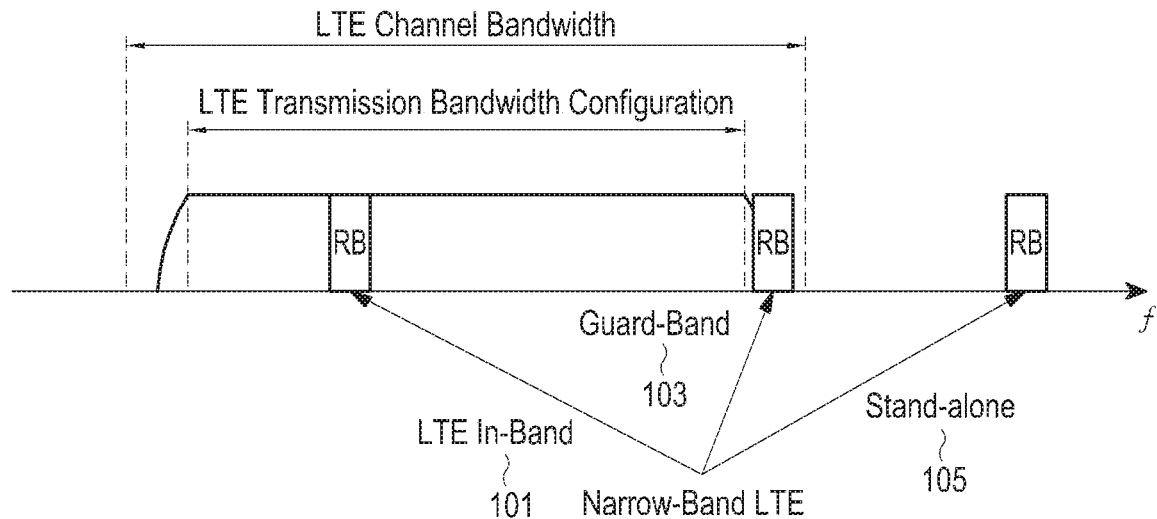
FIG. 1 illustrates a mode in which a narrow-band LTE system operates according to an embodiment of the present disclosure.

Hereinafter, various embodiments of the present invention will be described in detail with reference to the accompanying drawings. The attached drawings of the present disclosure are provided to help understanding of the present disclosure, and it should be noted that the present disclosure is not limited by forms, arrangement, etc., illustrated in the drawings of the present disclosure. Further, a detailed description of a known function and configuration which may make the subject matter of the present invention unclear will be omitted. In the following description, only parts necessary for understanding of operations according to various embodiments of the present disclosure will be described and other parts will not be described not to obscure the subject matter of the present disclosure.

Hereinafter, various embodiments will be described in detail with reference to the attached drawings. Embodiments and terms used therein are not intended to limit the present disclosure to particular embodiments, and it should be construed as including various modifications, equivalents, and/or alternatives according to the embodiments of the present disclosure. In regard to the description of the drawings, like reference numerals refer to like elements. The singular forms are intended to include the plural forms as well, unless the context clearly indicates otherwise. In the present disclosure, an expression such as "A or B," "at least one of A or/and B," or "one or more of A or/and B" may include all possible combinations of together listed items. Expressions such as "first," "second," "primarily," or "secondary," used herein may represent various elements regardless of order and/or importance and do not limit corresponding elements. When it is described that an element (such as a first element) is "operatively or communicatively coupled with/to" or "connected" to another element (such as a second element), the element can be directly connected to the other element or can be connected to the other element through another element (e.g., a third element).

An expression "configured to (or set)" used in the present disclosure may be replaced with, for example, "suitable for," "having the capacity to," "adapted to," "made to," "capable of," or "designed to" according to a situation. Alternatively, in some situation, an expression "apparatus configured to" may mean that the apparatus "can" operate together with another apparatus or component. For example, a phrase "a processor configured (or set) to perform A, B, and C" may be a dedicated processor (e.g., an embedded processor) for performing a corresponding operation or a generic-purpose processor (such as a central processing unit (CPU) or an application processor) that can perform a corresponding operation by executing at least one software program stored at a memory (or a storage unit).

In the present disclosure, a narrow-band system includes various communication systems capable of providing an Internet of Things (IoT) service in a band of a broadband system. The IoT service includes a cellular IoT (CIoT) service, and the broadband system includes cellular-based communication systems such as a 4th-generation (4G) system, e.g., a Long-Term Evolution (LTE) system capable of transmitting a large amount of data at high speeds, a $5^{th}$-generation (5G) system currently under discussion, and so forth. While embodiments of the present disclosure will be described using an example of a narrow-band LTE system for CIoT (also called a CIoT system, an LTE-LITE system, a narrow-band IoT system, etc.) for convenience, the present disclosure is not limited to an LTE system and is applicable to various communication systems capable of providing an IoT service. In the present disclosure, a user equipment (UE) may be referred to as various names such as a terminal, a mobile station (MS), an IoT device, etc., and may include a UE supporting both a broadband system and a narrow-band system as well as a dedicated UE for a IoT service provided in a narrow-band system.

FIG. 1 illustrates a mode in which a narrow-band LTE system operates according to an embodiment of the present disclosure.

Referring to FIG. 1, an operation mode of narrow-band LTE may include a mode operating in a band (in-band) 101 or a guard band 103 of an LTE system and a mode operating stand-alone 105 in a band that is not the band of the LTE system.

Figure 2:
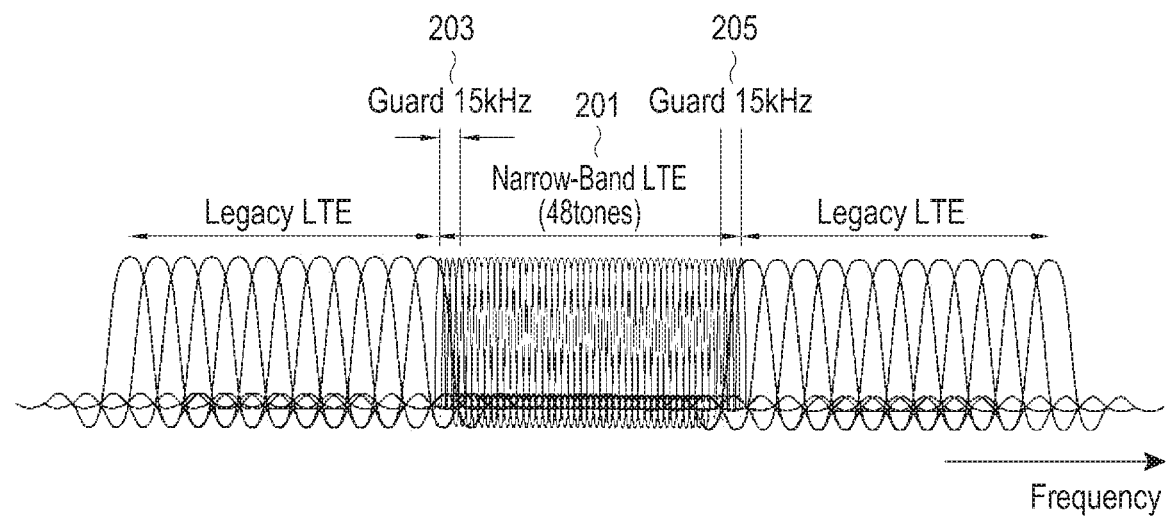
FIG. 2 illustrates a case in which a narrow-band LTE system operates in a narrow-band LTE system according to an embodiment of the present disclosure.

The narrow-band LTE transmits and receives a signal by using a region corresponding to one RB in a band of an LTE system. As an example of basic numerology for an uplink (UL) signal of narrow-band LTE, a subcarrier spacing may be set to, for example, 3.75 kHz. In this case, as shown in FIG. 2, a total of 48 narrow-band LTE subcarriers (or tones) 201 may be included in a region corresponding to one RB of the LTE system in a band of the LTE system.

Figure 3:
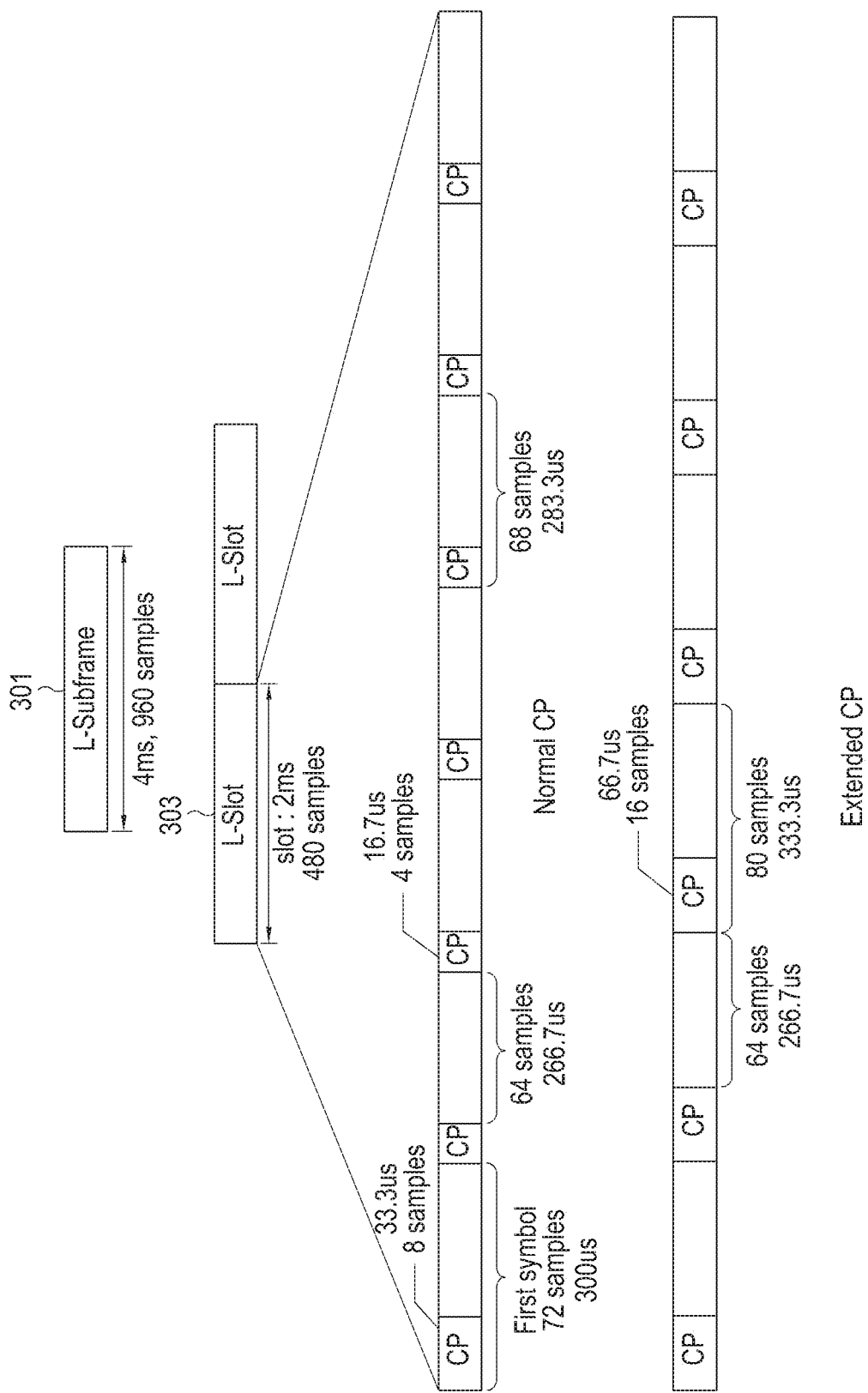
FIG. 3 illustrates an UL frame structure in a narrow-band LTE system according to an embodiment of the present disclosure.

FIG. 3 illustrates an UL frame structure in a narrow-band LTE system according to an embodiment of the present disclosure.

Referring to FIG. 3, structures of an L-slot 303 and an L-subframe 301 that are possible in the narrow-band LTE. If subcarrier spacings of the narrow-band LTE system and a legacy LTE system are different from each other, interference may exist between the two systems and to alleviate the interference, a guard band may be set. In FIG. 2, guard bands 203 and 205 of 15 kHz are used in both sides, and a band of 150 kHz except for the guard bands 203 and 205 is used for actual transmission and reception. However, if the narrow-band LTE system operates in the guard-band mode or the stand-alone band of the LTE system, the guard band may be used differently for each scenario.

Figure 4:
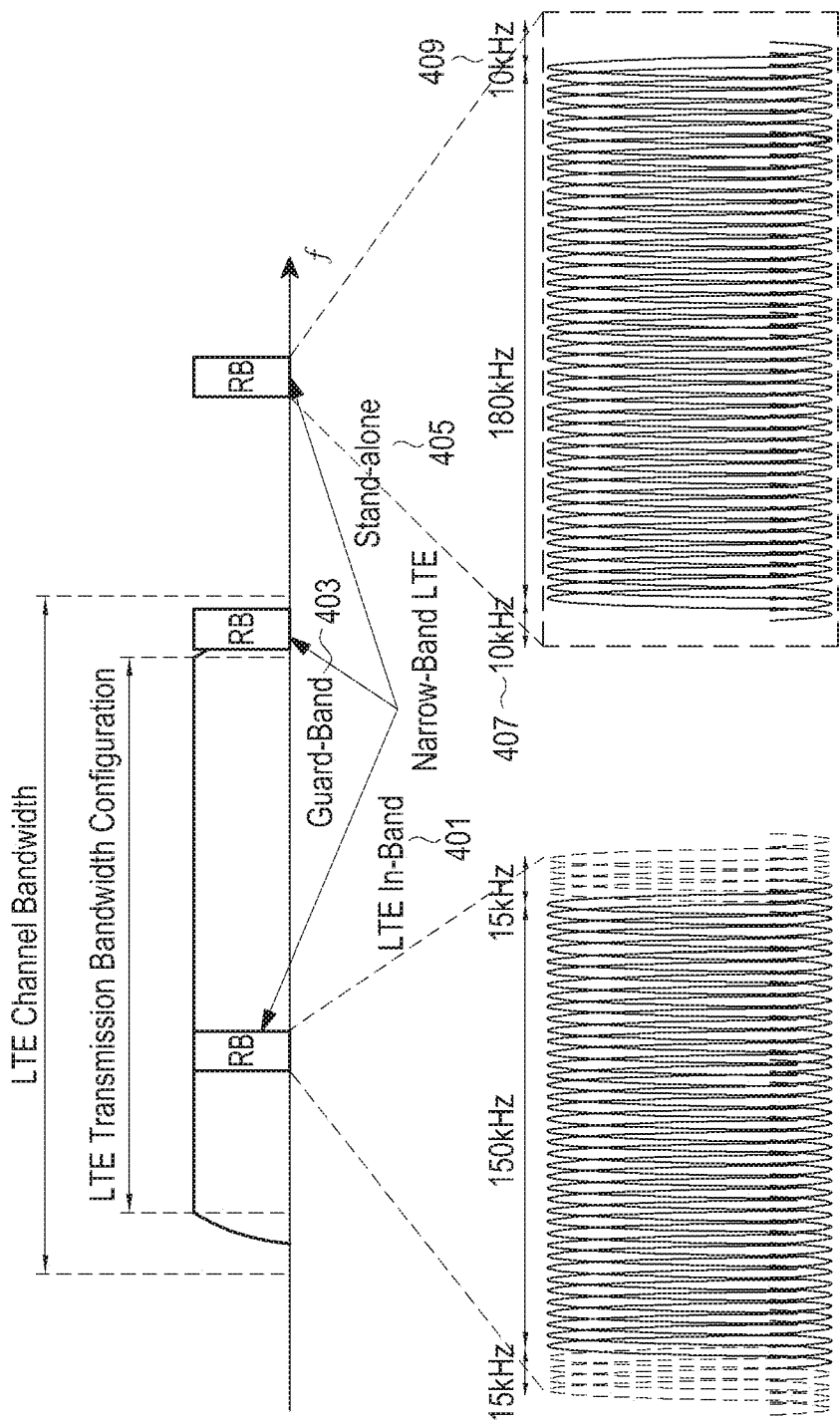
FIG. 4 illustrates an operation of adjusting a guard used when a narrow-band LTE system operates in-band of LTE or stand-alone according to an embodiment of the present disclosure.

FIG. 4 illustrates an operation of adjusting a guard band used when a narrow-band LTE system operates in-band of LTE or stand-alone according to an embodiment of the present disclosure.

For example, as shown in FIG. 4, if a band of 200 kHz is allocated in a stand-alone mode 405, a narrow-band LTE resource 411 (not shown?) designed based on 180 kHz may be used without using a guard band, and 10 kHz guard bands 407 and 409 are allocated in both sides, avoiding use of an additional guard in 180 kHz. A UE of the narrow-band LTE system receives system information about In-Band 401/ Guard-Band 403/Stand-Alone 405 from a downlink (DL) signal in a process of initially accessing a cell and obtaining synchronization and determines the amount of use of a guard band based on the system information.

Figure 5:
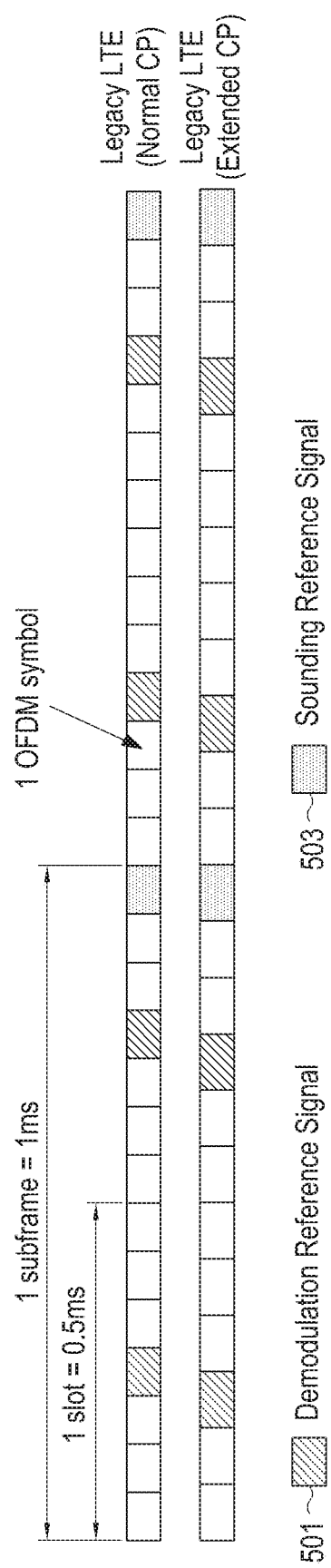
FIG. 5 illustrates resource positions of a demodulation reference signal (DMRS) and a sounding reference signal (SRS) in a normal cyclic prefix (CP)/extended CP of an LTE system.

FIG. 5 illustrates resource positions of a demodulation reference signal (DMRS) and a sounding reference signal (SRS) in a normal cyclic prefix (CP)/extended CP of an LTE system.

In the LTE system, an UL signal transmits one DMRS 501 in one slot and an SRS 503 by using the last symbol in one subframe as shown in FIG. 5. In the LTE system, the UE may have to transmit an RSR across the entire band of the LTE system in an UL even in an RB region that is not allocated to the UE. Thus, when a signal of the narrow-band LTE system is transmitted in a band of the LTE system, UL signal transmission of the narrow-band LTE system may be performed considering the SRS transmitted by the UE.

Figure 6:
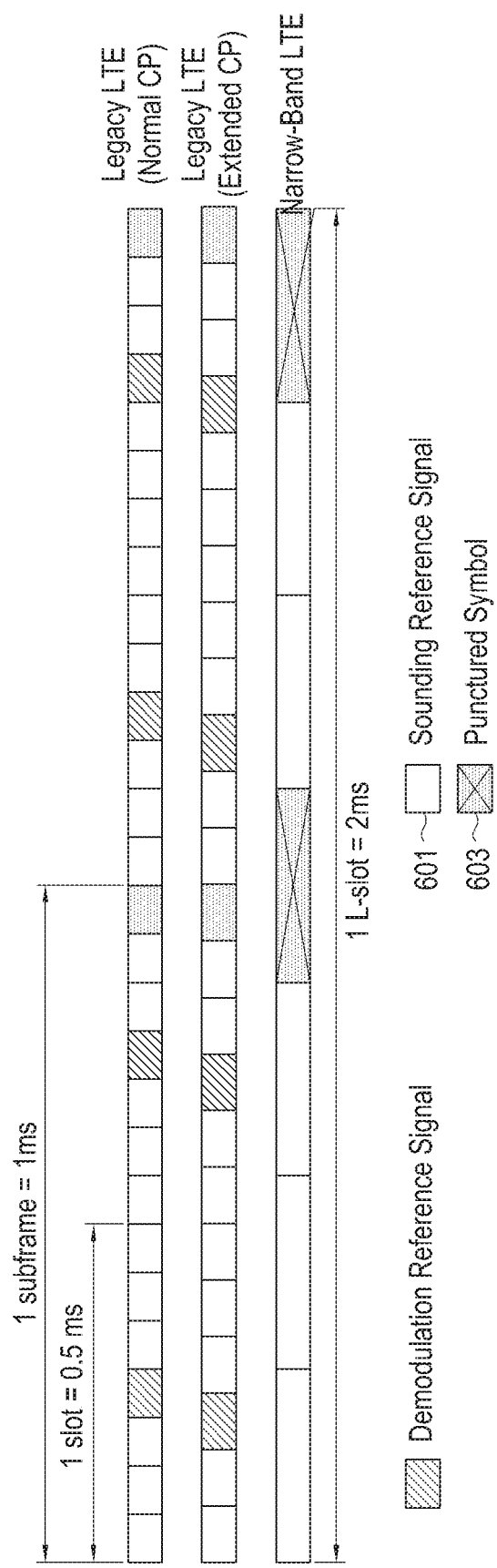
FIG. 6 illustrates a puncturing operation for avoiding a conflict with an SRS of an LTE system in a narrow-band LTE system according to an embodiment of the present disclosure.

FIG. 6 illustrates a puncturing operation for avoiding a conflict with an SRS of an LTE system in a narrow-band LTE system according to an embodiment of the present disclosure.

In the embodiment of FIG. 6, the narrow-band LTE system may employ a shortened a physical uplink shared channel (PUSCH)/physical uplink control channel (PUCCH). As shown in FIG. 6, when a UE of the LTE system transmits an SRS 601 using an RB allocated to the narrow-band LTE system, a UE of the narrow-band LTE system punctures a symbol 603 overlapping with an SRS

601 of the LTE system and transmits the symbol 603. As such, in the LTE system, UL transmission in which the symbol 603 of the narrow-band LTE system, which overlaps with a symbol in which the SRS 601 is transmitted, is punctured will be referred to as shortened PUSCH/PUCCH. In the narrow-band LTE system, information indicating whether to use shortened PUSCH/PUCCH may be transmitted from a BS to a UE through downlink control information (DCI). When the narrow-band LTE system operates in a guard band or stand-alone, there is no signal of the LTE system and thus shortened PUSCH/PUCCH may not be used.

In another embodiment, the symbol of the narrow-band LTE system, which overlaps with the symbol in which the SRS is transmitted, may be transmitted without being punctured. In this case, there is no problem if the UE of the LTE system does not transmit the SRS in an RB region allocated to narrow-band LTE, but if the SRS is transmitted to the RB region, the SRS overlaps with the signal of the narrow-band LTE system and is received by the BS, thus acting as interference during decoding of the signal of the narrow-band LTE system. However, if an overlapping portion between the signal of the narrow-band LTE system and the SRS of the LTE system is not large (information indicating so may be provided to the UE by the BS), there may be no problem in narrow-band LTE operations.

Figure 7:
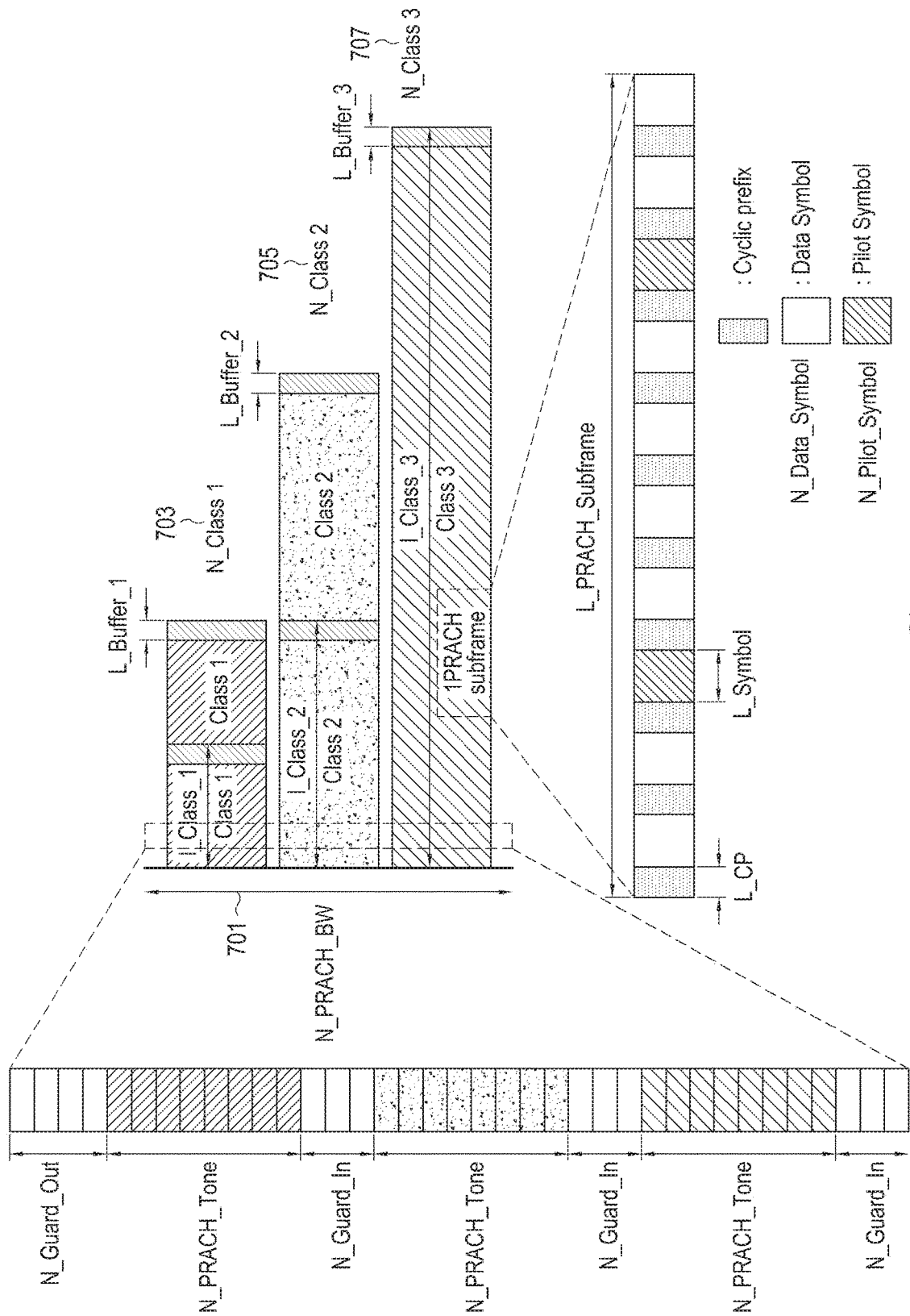
FIG. 7 illustrates a physical random-access channel (PRACH) frame format and a resource allocation method in a narrow-band LTE system according to an embodiment of the present disclosure.
Figure 8:
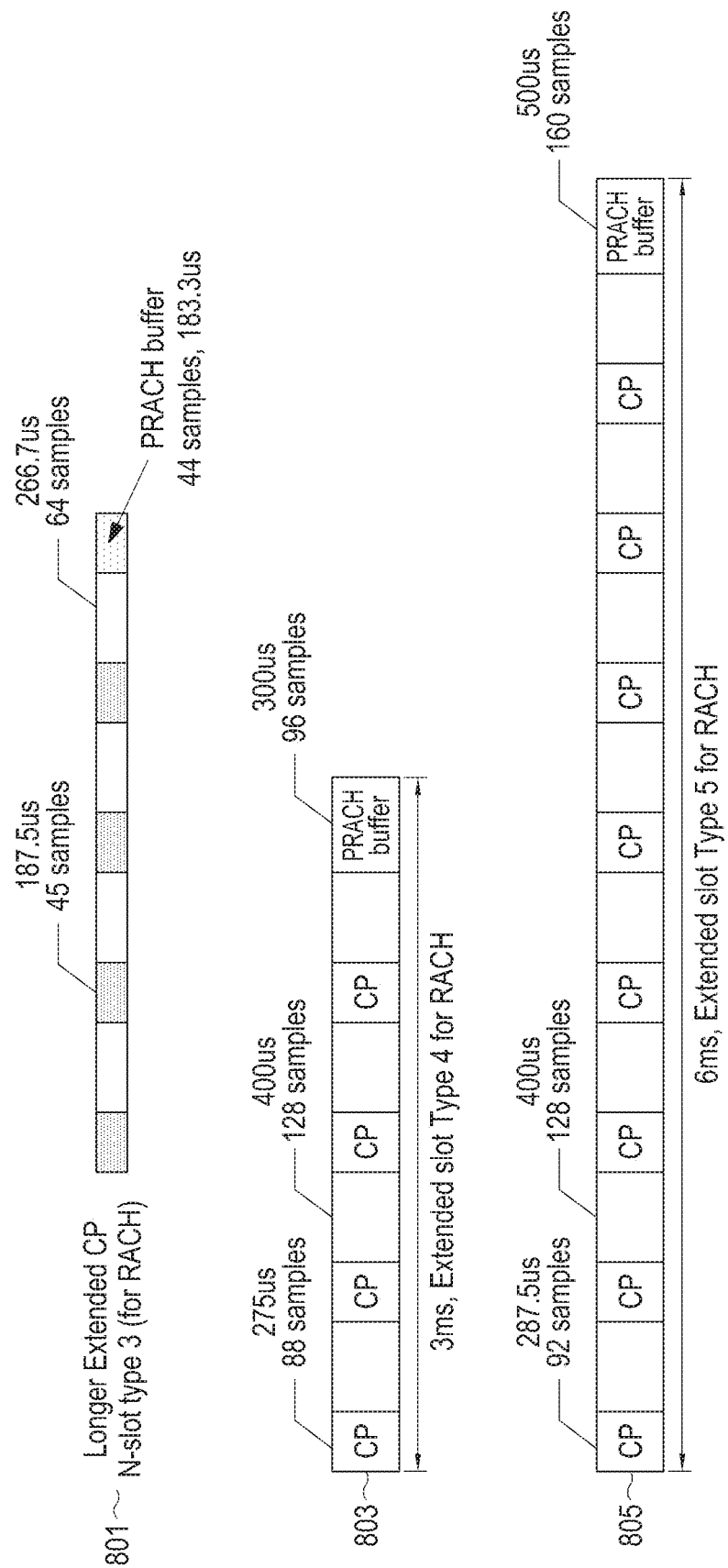
FIG. 8 illustrates a slot structure separately defined for a PRACH in a narrow-band LTE system according to an embodiment of the present disclosure.

FIG. 7 illustrates a PRACH frame format and a resource allocation method in a narrow-band LTE system according to an embodiment of the present disclosure, and FIG. 8 illustrates a slot structure separately defined for a PRACH in a narrow-band LTE system according to an embodiment of the present disclosure.

As in the example of FIG. 7, in the narrow-band LTE system, a part of an UL time and some of frequency resources may be allocated to a PRACH, and a position of the PRACH in terms of time and frequency resource may be transmitted through system information of a physical broadcast channel (PBCH). In the narrow-band LTE system, the BS changes the amount of resources allocated to the PRACH as needed according to the degree of loading of an UL UE in operation 701. In the narrow-band LTE system, PRACH resources in different subcarrier positions may also be used according to coverage class levels 703, 705, and 707 of the UE. A frame format used in a PRACH may be separately defined as in the example of FIG. 8, and a length of a time resource used may vary with each coverage class. The frame format separately defined may have a different subcarrier spacing. For example, in the example of FIG. 8, a slot type 3 801 has a subcarrier spacing of 3.75 kHz, but a slot type 4 803 and a slot type 5 805 have subcarrier spacings of 2.5 kHz. Variables shown in the example of FIG. 7 may be defined as below.

N_PRACH_BW: a frequency resource size occupied by a PRACH

L_CP: a cyclic prefix length in a PRACH

L_Symbol: a symbol length in a PRACH

L_PRACH_Subframe: a time resource length of a PRACH basic transmission unit

N_Data_Symbol: the number of data symbols in one PRACH subframe

N_Pilot_Symbol: the number of pilot symbols in one PRACH subframe

N_Guard_Out: the number of guard subcarriers for separating a frequency domain of a PRACH from other parts N_PRACH_Tone: the number of PRACH subcarriers used by one coverage class N_Guard_In: the number of guard subcarriers for separating coverage classes from each other in a PRACH L_Buffer_x: a time resource length of a buffer for avoiding interference with a PUSCH at the rear of a PRACH period and other PRACH resources. This may be set to a different value for each coverage class X.

L_Class_x: a time resource length of the coverage class x

N_Class_x: the number of time resources of the coverage class x. This is adjusted by a BS according to a circumstance.

N_Coverage_Class: the number of coverage classes

In an embodiment of the present disclosure, a BS may change a time used for each coverage class and the amount of frequency resources as needed, and may transmit changed information as system information in a PBCH to a narrow-band LTE UE.

Figure 9:
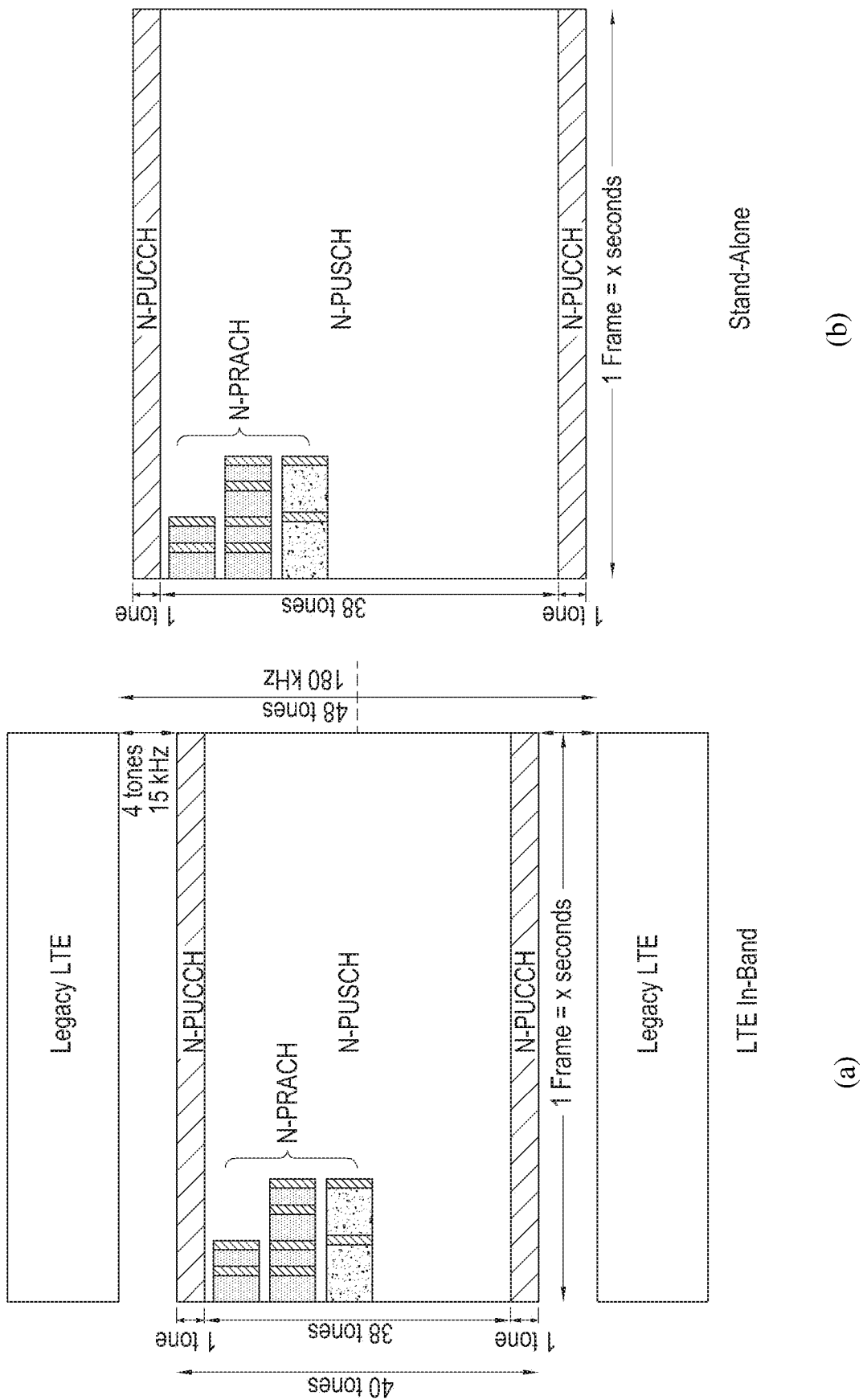
FIG. 9 illustrates a frame structure of a PRACH in a narrow-band LTE system according to an embodiment of the present disclosure.
Figure 10:
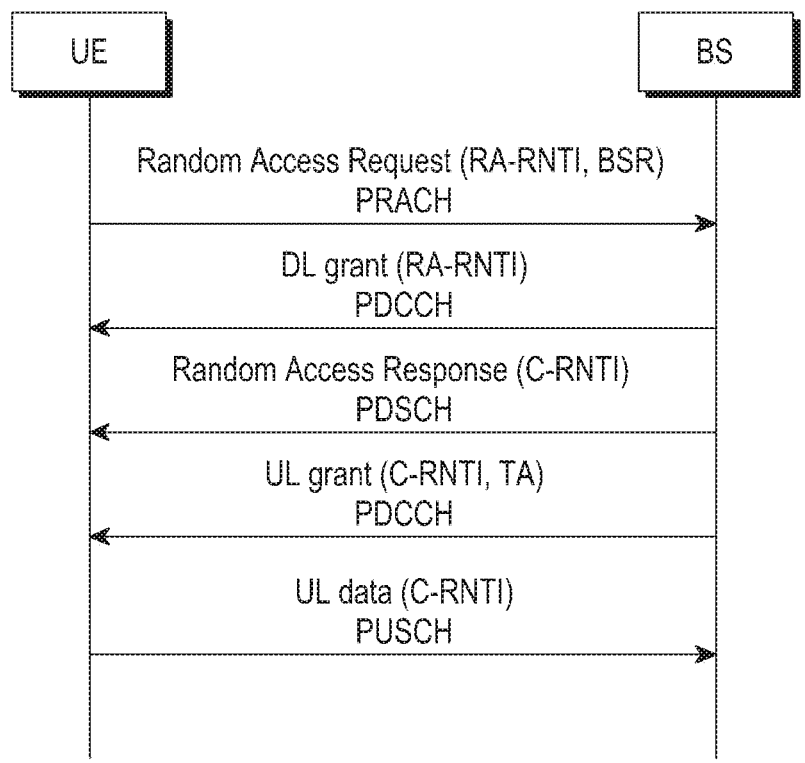
FIG. 10 is a ladder diagram showing a PRACH execution process in a narrow-band LTE system according to an embodiment of the present disclosure.

FIG. 9 illustrates a frame structure of a PRACH in a narrow-band LTE system according to an embodiment of the present disclosure, and FIG. 10 is a ladder diagram showing a PRACH execution process in a narrow-band LTE system according to an embodiment of the present disclosure. In (a) of FIG. 9, if the narrow-band LTE system operates in a band/guard band of the LTE system, only one of several levels of a coverage class is used, and thus for example, only an extended slot type 3 of FIG. 8 may be used. When the narrow-band LTE system operates stand-alone as in an example shown in (b) of FIG. 9, all levels of the coverage class are applied due to the use of a broader coverage, and thus for example, all of extended slot types 3, 4, and 5 of FIG. 8 may be used. A PRACH procedure of the narrow-band LTE system in FIG. 10 is similar with a PRACH procedure of an existing LTE system and thus will not be described in detail.

Figure 11:
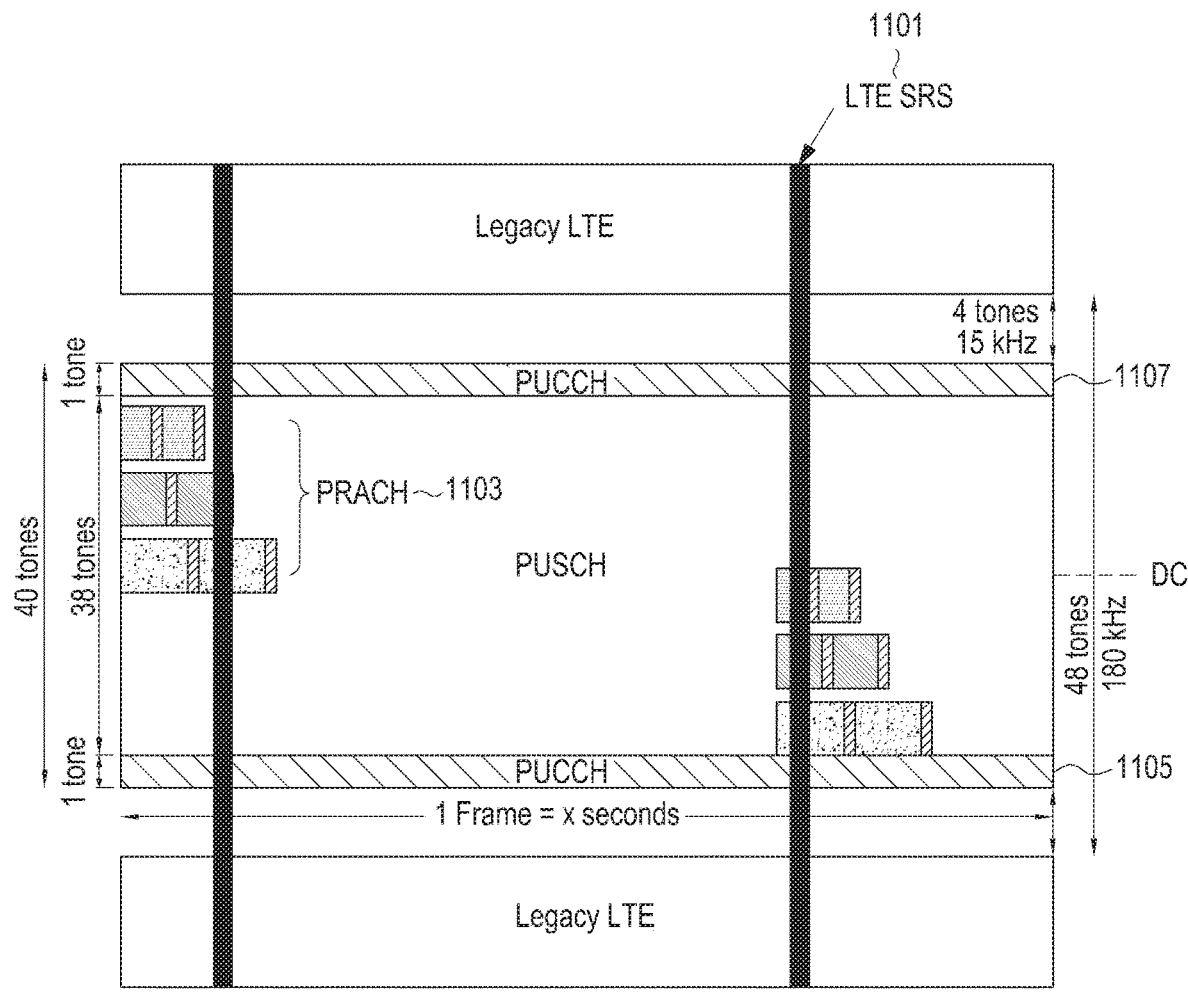
FIG. 11 illustrates resource positions of a physical uplink control channel (PUCCH), a PRACH, and a physical uplink shared channel (PUSCH) in a narrow-band LTE system according to an embodiment of the present disclosure.

FIG. 11 illustrates resource positions of a PUCCH, a PRACH, and a PUSCH in a narrow-band LTE system according to an embodiment of the present disclosure.

Referring to FIG. 11, even in PRACH transmission of narrow-band LTE, overlapping with an SRS 1101 transmitted by the UE in the LTE system may occur. Also in this case, the BS may puncture a PRACH resource 1103 of the narrow-band LTE system, which overlaps with an SRS resource of the LTE system, if necessary. Information for puncturing may be transmitted to the UE of the narrow-band LTE system through system information of the PBCH, which indicates a resource position of the PRACH.

In FIG. 11, PUCCHs 1105 and 1107 reserve edge tones for use. A resource position of a PUCCH used by each UE may be indicated to the UE through a DL grant for DL data transmission. In this case, resource positions of PUCCHs to be used by different UEs may be separated from each other or overlap with each other. If the resource positions are separated, data is transmitted separately in the time domain; if the resource positions overlap, ack/nack information of several UEs may be transmitted at the same time using an orthogonal sequence. If the number of UEs increases and thus there are not enough PUCCH resources, ack/nack information of several UEs may be transmitted overlappingly using a non-orthogonal sequence.

In another embodiment, resources to be used as PUCCH resources may be used in addition to edge tones. Information about the resources may be transmitted to the UE from the BS through a DL grant. In another embodiment, a part of a PUSCH region may be used as a PUCCH resource. In this case, the BS may determine whether to transmit ack/nack information for DL data in a PUCCH or a PUSCH in the DL grant.

A more detailed description will be made of an SRS conflict handling scheme for avoiding a conflict with an SRS of an LTE system in a narrow-band LTE system, proposed in the present disclosure.

In the narrow-band LTE system, for the above-described in-band mode, IoT resources (i.e., NB-IoT PRBs) of the narrow-band LTE system may be configured for SRS transmission in the legacy LTE system. The BS may generate an SRS configuration in system information for indicating the SRS transmission. For example, the SRS configuration may indicate an SRS configuration index (e.g., a transmission subframe index) and a transmission period. A plurality of SRS configurations may be indicated for different scenarios, and the SRS configuration index is indicated by the system information. The UE obtains SRS configuration information after receiving the system information.

The BS indicates whether to activate SRS transmission. If SRS transmission is activated, the UE(s) may recognize that there may be SRS transmission based on the indication. The BS indicates whether to activate SRS transmission in an UL grant.

For PUSCH transmission having 15 kHz subcarrier occupancy, the following schemes (option 1, option 2) for controlling a resource conflict with SRS transmission may be considered:

Option 1: if the BS indicates SRS transmission through an indication in RRC signaling or an UL grant, PUSCH symbols (i.e., NB-PUSCH symbols) in the narrow-band LTE system may not be mapped to resource elements reserved for SRS transmission.

Option 2: if the BS indicates SRS transmission through an indication in RRC signaling or an UL grant, PUSCH symbols (i.e., NB-PUSCH symbols) in the narrow-band LTE system may be mapped to resource elements reserved for SRS transmission, but the mapped symbols may not be transmitted (may be punctured, for example).

Figure 12:
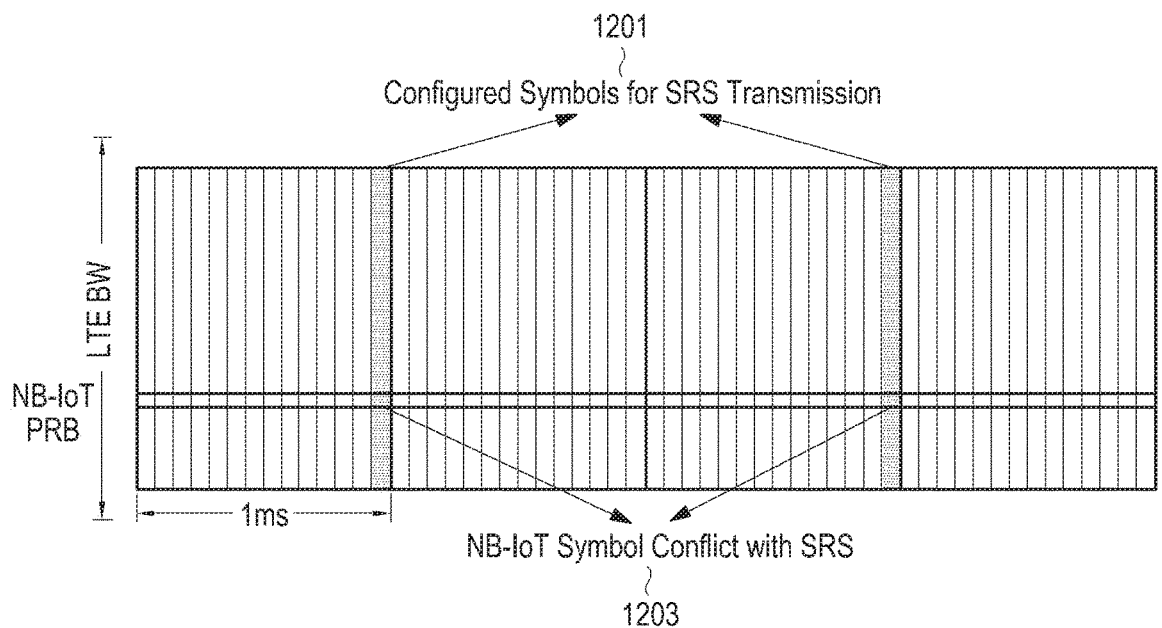
FIG. 12 illustrates a structure of an UL data channel in a narrow-band LTE system according to an embodiment of the present disclosure.

FIG. 12 illustrates a structure of an UL data channel in a narrow-band LTE system according to an embodiment of the present disclosure. The UL data channel may be referred to as an NB-PUSCH, an NPUSCH, etc.

Referring to FIG. 12, resources (symbols) 1203 of an UL data channel of the narrow-band LTE system, which overlap with resources (symbols) 1201 reserved for SRS transmission in the LTE system, are shown, and in the example of FIG. 12, like in option 1 and option 2, overlapping resources may not be counted in resource mapping, or even if the overlapping resources are counted in the resource mapping, the mapped symbol(s) may not be transmitted.

For PUSCH transmission having 3.75 kHz subcarrier occupancy, the following schemes (option 1, option 2, and option 3) for controlling a resource conflict with SRS transmission may be considered:

Option 1: if the BS indicates SRS transmission through an indication in RRC signaling or an UL grant, PUSCH symbols (i.e., NB-PUSCH symbols) in the narrow-band LTE system may not be mapped to resources overlapping with resources reserved for SRS transmission.

Option 2: if the BS indicates SRS transmission through an indication in RRC signaling or an UL grant, PUSCH symbols (i.e., NB-PUSCH symbols) in the narrow-band LTE system may be mapped to resources overlapping with resources reserved for SRS transmission, but the mapped symbols may not be transmitted (may be punctured, for example).

Option 3: if the BS indicates SRS transmission through an indication in RRC signaling or an UL grant, a shortened PUSCH format is used in a resource mapping process in the narrow-band LTE system.

Figure 13:
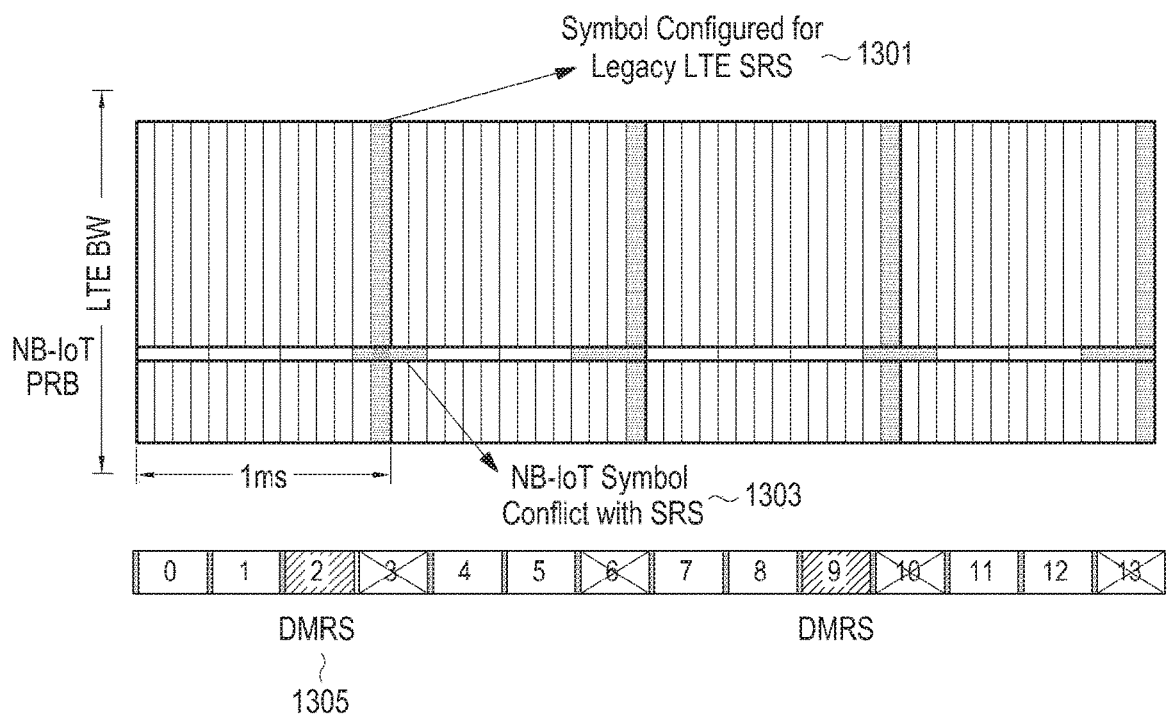
FIG. 13 is a view for describing a method for adjusting a conflict of resources of an UL data channel in a narrow-band LTE system according to an embodiment of the present disclosure.

FIG. 13 is a view for describing a method for adjusting a conflict between resources of an UL data channel in a narrow-band LTE system according to an embodiment of the present disclosure.

Referring to FIG. 13, resources (symbols) 1303 of an UL data channel of the narrow-band LTE system, which overlap with resources (symbols) 1301 reserved for SRS transmission in the LTE system, are shown, and in the example of FIG. 13, like in option 1 and option 2, overlapping resources may not be counted in resource mapping, or even if the overlapping resources are counted in the resource mapping, the mapped symbol(s) may not be transmitted. A demodulation reference signal (DMRS) 1305 in the narrow-band LTE system may be located in symbol(s) that do not overlap with resources for SRS transmission. The DMRS 1305 may be located in symbol(s) adjacent to a symbol overlapping with resources reserved for SRS transmission (for example, refer to reference numeral 1405 of FIG. 14). The adjacent symbol(s) may include a symbol preceding or following the overlapping symbol.

Figure 14:
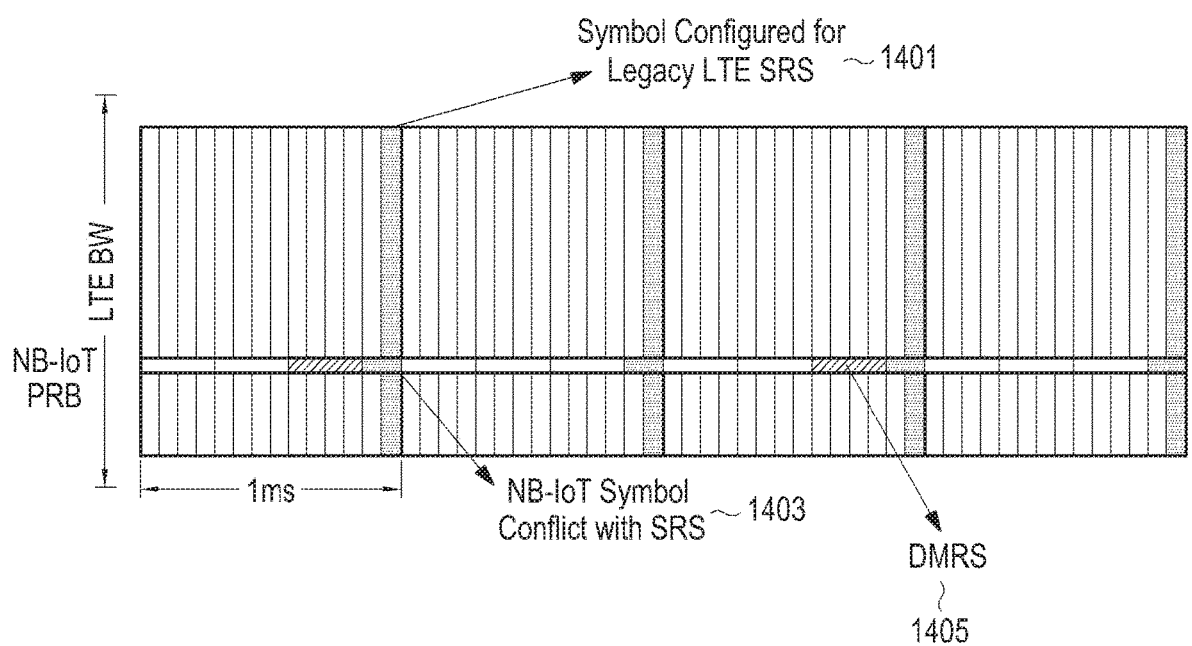
FIG. 14 is a view for describing a method for setting a gap period of an UL data channel in a narrow-band LTE system according to an embodiment of the present disclosure.

FIG. 14 is a view for describing a method for setting a gap period of an UL data channel in a narrow-band LTE system according to an embodiment of the present disclosure, and referring to FIG. 14, a conflict with SRS transmission may be avoided by a predefined gap period 1403 in resources of an UL data channel of the narrow-band LTE system, which overlap with resources 1401 for SRS transmission. The gap period 1403 is related to a preset CP length.

A description will be made of a synchronization signal transmission scheme for an in-band CIoT system in a band of the LTE system according to the present disclosure.

In the present disclosure, a CIoT system synchronization signal may be transmitted using resource element(s) other than resource element(s) to which a reference signal and a control channel of the LTE system transmitted in a particular PRB or over the entire frequency band are allocated.

Figure 15:
FIG. 15 illustrates an example of resource allocation for synchronous signal transmission of a CIoT system in a narrow-band LTE system according to an embodiment of the present disclosure.
Figure 15:
Figure 15:
Figure 15:
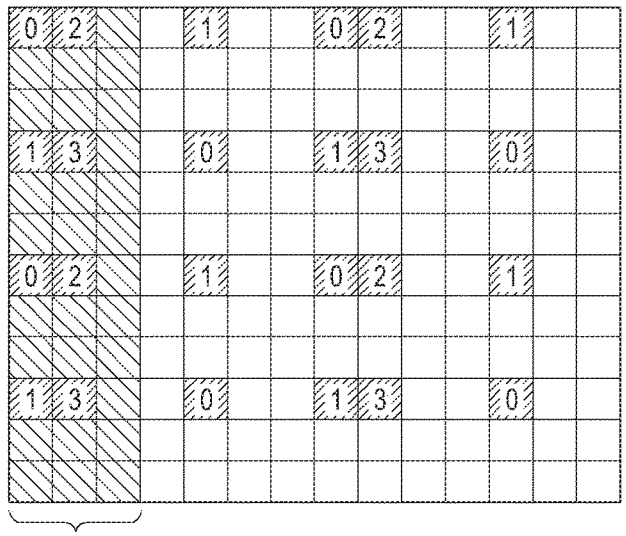
Figure 15:
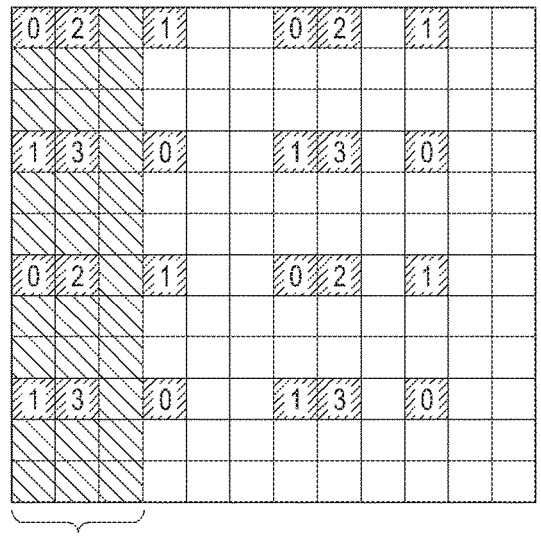

FIG. 15 illustrates an example of resource allocation for synchronous signal transmission of a CIoT system in a narrow-band LTE system according to an embodiment of the present disclosure, showing resource allocation in which a synchronization signal of the CIoT system is transmitted in REs other than a PDCCH and a cell-specific reference signal (CRS) in an LTE system band according to the present disclosure.

Referring to (a) and (b) of FIG. 15, a CRS 1503 is shown for a total of four antenna ports, and a PDCCH 1505 is shown for the first three OFDM symbols 1507 and 1509 of the subframe. Positions of REs allocated with the CRS 1503 may be changed on a time axis by a cell ID and various parameters of an LTE BS, and the PDCCH 1505 may occupy the first one through three OFDM symbols 1507 and 1509 on the time axis. The synchronization signal 1501 of the CIoT system may be transmitted through REs other than the PDCCH 1505 and the CRS 1503.

Figure 16:
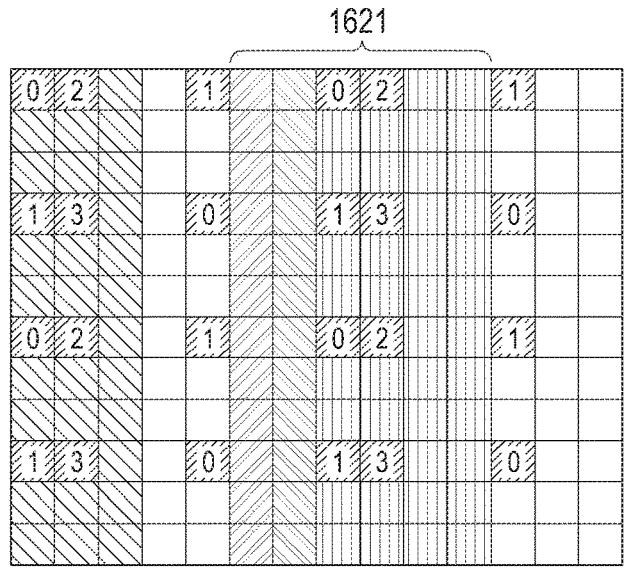
FIG. 16 illustrates another example of resource allocation for synchronous signal transmission of a CIoT system in a narrow-band LTE system according to an embodiment of the present disclosure.
Figure 16:
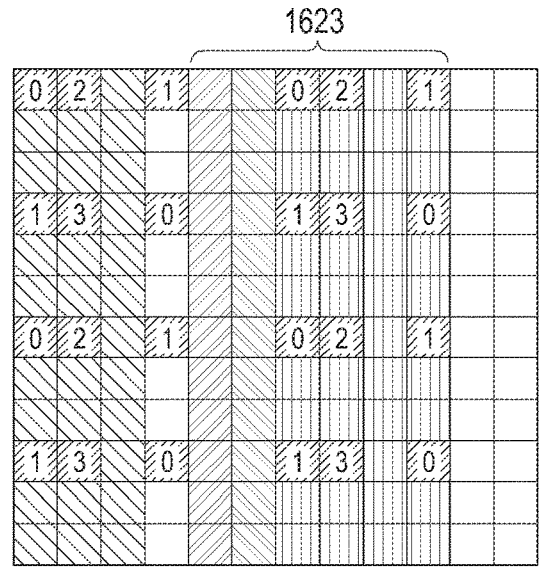

FIG. 16 illustrates another example of resource allocation for synchronous signal transmission of a CIoT system in a narrow-band LTE system according to an embodiment of the present disclosure, showing resource allocation in which a synchronization signal of the CIoT system is transmitted in one PRB corresponding to, for example, the 0th subframe among six middle PRBs allocated with a primary synchronization signal (PSS), a secondary synchronization signal (SSS), and a physical broadcast channel (PBCH).

Referring to (a) and (b) of FIG. 16, in the LTE system band, a PSS 1609, an SSS 1607, and a PBCH 1605 are allocated to the 0th or 5th subframe (1 ms) among the six middle PRBs 1621 and 1623. In the LTE system, the positions of the PBCH 1605, the PSS 1609, and the SSS 1607 are fixed in the PRBs considered in the example of FIG. 16. In the example of FIG. 16, the synchronization signal 1601 of the CIoT system may be transmitted in REs other than REs allocated with the PDCCH 1611, the PSS 1609, the SSS 1607, the PBCH 1605, and the CRS 1603.

Figure 17:
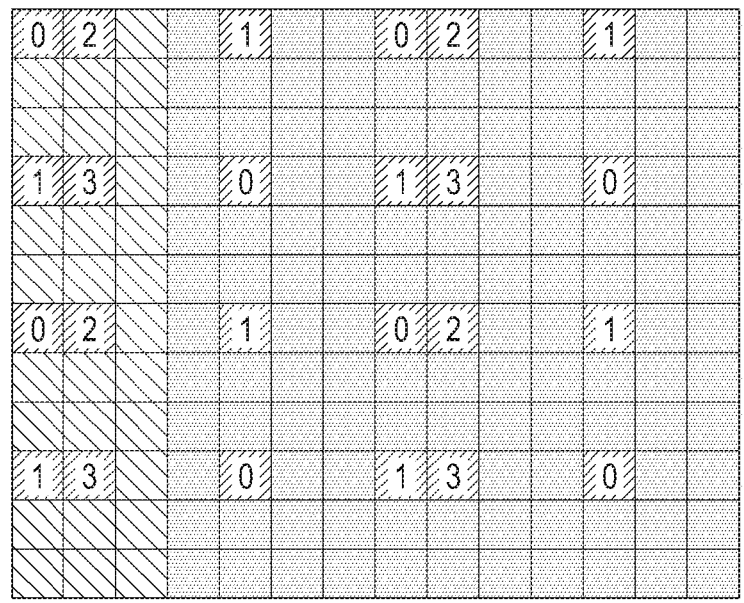
FIG. 17 illustrates another example of resource allocation for synchronous signal transmission of a CIoT system in a narrow-band LTE system using a normal CP according to the present disclosure.

FIG. 17 illustrates another example of resource allocation for synchronous signal transmission of a CIoT system in a narrow-band LTE system using a normal CP according to the present disclosure. Referring to FIG. 17, a synchronization signal 1701 of the narrow-band LTE system (i.e., the CIoT system) is allocated to REs other than REs to which reference signals 1703 or control channels 1705 are allocated in PRBs of the LTE system. In this case, the synchronization signal 1701 may include one sequence or several sequences, and these sequences may be allocated to REs corresponding to the synchronization signal 1701 of the CIoT system shown in FIG. 17, in which each sequence may be continuously or discontinuously allocated on a time axis or a frequency axis. The CIoT synchronization signals 1701 may be transmitted by being allocated to all or some of REs other than REs allocated with reference signals 1703 and control channels 1705 of the LTE system among REs in a PRB of the LTE system.

Figure 18:
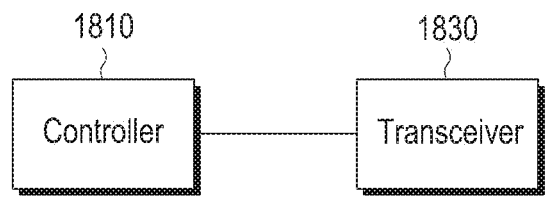
FIG. 18 is a block diagram of an apparatus applicable to a user equipment (UE) and a base station (BS) according to an embodiment of the present disclosure.

FIG. 18 is a block diagram of an apparatus applicable to a UE and a BS according to an embodiment of the present disclosure, in which the apparatus of FIG. 18 may include a controller 1810 which controls UL communication according to at least one method (or combinations thereof) and configuration of the embodiments shown in FIGS. 1 through 17, arbitrates (controls) a conflict with resources of an UL channel of the narrow-band LTE system, which overlap with resources for SRS transmission, and controls transmission of a synchronization signal, and a transceiver 1830 for data transmission and reception. The controller 1810 may include one processor or a plurality of processors.

The UE of the present disclosure, which arbitrates (controls) a conflict with resources of an UL data channel in the narrow-band LTE system, overlapping with resources for SRS transmission, may include a transceiver configured to transmit and receive data and a controller configured to receive control information related to UL transmission of symbols from a BS and to perform the UL transmission in a narrow-band system using symbols except for a second symbol overlapping with a first symbol for transmission of an UL reference signal in a broadband system, based on the control information.

The BS of the present disclosure, which arbitrates (controls) a conflict with resources of an UL data channel in the narrow-band LTE system, overlapping with resources for SRS transmission, may include a BS including a transceiver configured to transmit and receive data and a controller configured to transmit control information related to uplink (UL) transmission of symbols to a user equipment (UE) and to receive UL data from the UE based on the control information, in which in a narrow-band system, the UL data is received through symbols except for a second symbol overlapping with a first symbol for transmission of an UL reference signal in a broadband system.

According to the embodiments of the present disclosure, a conflict of resources of an UL data channel in the narrow-band LTE system, which overlap with resources for SRS transmission, may be avoided. According to the embodiments of the present disclosure, resources for synchronization signal transmission of the CIoT system may be efficiently allocated, and in the transmission and reception system for CIoT, a signal may be efficiently transmitted and received in a band or a guard band of the legacy LTE system in cooperation with the legacy LTE system, and at the same time, the signal may be transmitted and received frequency-efficiently in the stand-alone mode.

The invention claimed is:

1. A method of a user equipment (UE) in a communication system, the method comprising:
   receiving, from a base station (BS), a message including information indicating whether the UE uses symbols used for a NarrowBand (NB)-Internet of Things (IoT) system for a uplink (UL) data channel transmission or the UE punctures the UL data channel transmission in at least one symbol used for the NB-IoT system overlapping with reference signal (RS); and
   transmitting the symbols, or puncturing the UL data channel transmission in the at least one symbol based on the information,
   wherein the UL data channel transmission is for the NB-IoT system, the RS is for a Long-Term Evolution (LTE) system and a demodulation RS for the NB-IoT system is transmitted through a symbol, and the symbol does not overlap with the RS for the LTE system.

2. The method of claim 1, wherein the RS is a sounding reference signal (SRS).

3. The method of claim 1, wherein a first resource for the at least one symbol is counted in resource mapping for the UL data channel transmission, and the first resource is not used for the UL data channel transmission.

4. The method of claim 1, wherein the UL data channel is a narrowband physical uplink shared channel (NPUSCH).

5. The method of claim 1, wherein a gap period is set based on a predefined cyclic prefix length.

6. A user equipment (UE) in a communication system, the UE comprising:
   at least one processor; and
   a transceiver connected to the at least one processor and configured to:
     receive, from a base station (BS), a message including information indicating whether the UE uses symbols used for a NarrowBand (NB)-Internet of Things (IoT) system for a uplink (UL) data channel transmission or the UE punctures the UL data channel transmission in at least one symbol used for the NB-IoT system overlapping with reference signal (RS), and
     transmit the symbols, or puncture the UL data channel transmission in the at least one symbol based on the information,
   wherein the UL data channel transmission is for the NB-IoT system, the RS is for a Long-Term Evolution (LTE) system and a demodulation RS for the NB-IoT system is transmitted through a symbol, and the symbol does not overlap with the RS for the LTE system.

7. The UE of claim 6, wherein the RS is a sounding reference signal (SRS).

8. The UE of claim 6, wherein a first resource for the at least one symbol is counted in resource mapping for the UL data channel transmission, and the first resource is not used for the UL data channel transmission.

9. The UE of claim 6, wherein the UL data channel is a narrowband physical uplink shared channel (NPUSCH).

10. The UE of claim 6, wherein a gap period is set based on a predefined cyclic prefix length.

11. A method of a base station (BS) in a communication system, the method comprising:
   generating a message including information indicating whether a user equipment (UE) uses symbols used for a NarrowBand (NB)-Internet of Things (IoT) system for a uplink (UL) data channel transmission or the UE punctures the UL data channel transmission in at least one symbol used for the NB-IoT system overlapping with reference signal (RS); and
   transmitting the message,
   wherein the UL data channel transmission is for the NB-IoT system, the RS is for a Long-Term Evolution (LTE) system and a demodulation RS for the NB-IoT system is transmitted through a symbol, and the symbol does not overlap with the RS for the LTE system.

12. The method of claim 11, wherein the RS is a sounding reference signal (SRS).

13. The method of claim 11, wherein a first resource for the at least one symbol is counted in resource mapping for the UL data channel transmission, and the first resource is not used for the UL data channel transmission.

14. The method of claim 11, wherein the UL data channel is a narrowband physical uplink shared channel (NPUSCH).

15. The method of claim 11, wherein a gap period is set based on a predefined cyclic prefix length.

16. A base station (BS) in a communication system, the BS comprising:
   at least one processor configured to generate a message including information indicating whether a user equipment (UE) uses symbols used for a NarrowBand (NB)-Internet of Things (IoT) system for a uplink (UL) data channel transmission or the UE punctures the UL data channel transmission in at least one symbol used for the NB-IoT system overlapping with reference signal (RS); and
   a transceiver configured to transmit the message,
   wherein the UL data channel transmission is for the NB-IoT system, the RS is for a Long-Term Evolution (LTE) system and a demodulation RS for the NB-IoT system is transmitted through a symbol, and the symbol does not overlap with the RS for the LTE system.

17. The BS of claim 16, wherein the RS is a sounding reference signal (SRS).

18. The BS of claim 16, wherein a first resource for the at least one symbol is counted in resource mapping for the UL data channel transmission, and the first resource is not used for the UL data channel transmission.

19. The BS of claim 16, wherein the UL data channel is a narrowband physical uplink shared channel (NPUSCH).

20. The BS of claim 16, wherein a gap period is set based on a predefined cyclic prefix length.

* * * * *